(12) United States Patent
Remla

(10) Patent No.: US 12,449,835 B2
(45) Date of Patent: Oct. 21, 2025

(54) MEASURING AND COMPENSATING FOR CLOCK TREE VARIATION

(71) Applicant: Xilinx, Inc., San Jose, CA (US)

(72) Inventor: Riyas Noorudeen Remla, Singapore (SG)

(73) Assignee: Xilinx, Inc., San Jose, CA (US)

( * ) Notice: Subject to any disclaimer, the term of this patent is extended or adjusted under 35 U.S.C. 154(b) by 122 days.

(21) Appl. No.: 18/364,336

(22) Filed: Aug. 2, 2023

(65) Prior Publication Data

US 2025/0044827 A1  Feb. 6, 2025

(51) Int. Cl.
*G06F 1/12* (2006.01)
*G06F 1/08* (2006.01)

(52) U.S. Cl.
CPC . *G06F 1/12* (2013.01); *G06F 1/08* (2013.01)

(58) Field of Classification Search
CPC ..................................... G06F 1/10; G06F 1/08
See application file for complete search history.

(56) References Cited

U.S. PATENT DOCUMENTS

| | | | |
|---|---|---|---|
| 5,646,904 A * | 7/1997 | Ohno | G06F 13/1694 365/194 |
| 7,516,437 B1 | 4/2009 | Kannan et al. | |
| 8,015,537 B1 | 9/2011 | Sundararajan et al. | |
| 8,350,590 B1 | 1/2013 | Shimanek et al. | |
| 10,027,332 B1 * | 7/2018 | Wang | H04L 1/0082 |
| 10,203,718 B1 | 2/2019 | Narasimha | |
| 10,379,927 B2 | 8/2019 | Sanders et al. | |
| 2009/0058481 A1 * | 3/2009 | Kim | H03K 5/1534 327/175 |
| 2010/0064163 A1 * | 3/2010 | Choi | G11C 7/1072 713/400 |
| 2021/0271959 A1 * | 9/2021 | Chettuvetty | G06N 3/065 |
| 2023/0188140 A1 * | 6/2023 | Hoel | G06F 1/12 327/115 |

* cited by examiner

*Primary Examiner* — Phil K Nguyen
(74) *Attorney, Agent, or Firm* — Kevin T. Cuenot

(57) ABSTRACT

A system for clock variation measurement includes a first clock counter circuit configured to generate a plurality of first counts of a first clock signal, a second clock counter circuit configured to generate a plurality of second counts of a second clock signal, a first synchronizer circuit configured to synchronize the plurality of first counts according to a third clock signal, and a second synchronizer circuit configured to synchronize the plurality of second counts according to the third clock signal. The system includes a difference circuit configured to generate a plurality of differences from respective count pairs as synchronized. The system includes a variation circuit configured to generate a variation signal indicating an amount of variation between the first clock signal and the second clock signal based, at least in part, on the plurality of differences.

20 Claims, 12 Drawing Sheets

MEASURING AND COMPENSATING FOR CLOCK TREE VARIATION

TECHNICAL FIELD

This disclosure relates to integrated circuits (ICs) and, more particularly, to measuring and compensating for clock tree variation in ICs.

BACKGROUND

Many modern communication protocols require low and predictable latency. For example, the Peripheral Component Interconnect Express (PCIe) and the Common Public Ratio Interface (CPRI) communication protocols, to name a few, require low and predictable latency for proper operation. These requirements mean that the clock distribution network, or "clock tree," within a given integrated circuit (IC) must be capable of distributing clock signals throughout the IC with low and predictable latency.

Some ICs such as System-on-Chips (SoCs) for example, whether implemented as a large monolithic die or as a plurality of interconnected dies or interconnected chiplets, utilize a long and complex clock tree. Long and complex clock trees introduce clock tree variation into the operation of the IC. Clock tree variation, also referred to as voltage-temperature (VT) variation, arises from conditions that may include, but are not limited to, voltage droop, power supply variations, and/or temperature variations.

One technique for compensating for clock tree variation in an IC is through the insertion of circuit structures such as phase first-in-first-out (FIFO) memories. The phase FIFO memories may be inserted in the data paths of latency-sensitive circuitry. As the phase FIFO memories must be large enough to compensate for VT variation, inclusion of phase FIFO memories may require significant resources and/or area of the IC. Once inserted, phase FIFO memories often contribute an additional 2-3 clock cycles of latency in the data paths thereby degrading performance of the IC.

SUMMARY

In one or more example implementations, a system for clock variation measurement includes a first clock counter circuit configured to generate a plurality of first counts of a first clock signal. The system includes a second clock counter circuit configured to generate a plurality of second counts of a second clock signal. The system includes a first synchronizer circuit configured to synchronize the plurality of first counts according to a third clock signal. The system includes a second synchronizer circuit configured to synchronize the plurality of second counts according to the third clock signal. The system includes a difference circuit configured to generate a plurality of differences from respective count pairs as synchronized. Each count pair includes a selected first count of the plurality of first counts and a corresponding second count selected from the plurality of second counts. The system includes a variation circuit configured to generate a variation signal indicating an amount of variation between the first clock signal and the second clock signal based, at least in part, on the plurality of differences.

The foregoing and other implementations can each optionally include one or more of the following features, alone or in combination. Some example implementations include all the following features in combination.

In some aspects, the system includes a compensation circuit configured to compensate for the amount of variation determined by the variation circuit.

In some aspects, the system includes a beacon circuit configured to determine a direction of amount of the variation based on detecting transitions in a beacon signal. The compensation circuit is configured to compensate for the amount of variation between the first clock signal and the second clock signal in the direction determined by the beacon circuit.

In some aspects, the system includes a skip/add pattern insertion circuit configured to determine a direction of the amount of variation based on a read pointer and a write pointer of a data path clocked by the first clock signal and the second clock signal. The compensation circuit is configured to compensate for the amount of variation between the first clock signal and the second clock signal in the direction determined.

In some aspects, the variation circuit includes an averaging circuit configured to generate a plurality of averages of the plurality of differences over time.

In some aspects, the variation circuit includes a difference circuit configured to determine a plurality of further differences between selected averages of the plurality of averages and corresponding differences selected from the plurality of differences.

In some aspects, the first synchronizer circuit is coupled to an output of the first clock counter circuit and the second synchronizer circuit is coupled to an output of the second clock counter circuit.

In some aspects, the first clock counter circuit is configured as a Gray code counter circuit and the second clock counter circuit is configured as a Gray code counter circuit.

In some aspects, the third clock signal has a frequency and a phase that are uncorrelated with a frequency and a phase of the first clock signal and are uncorrelated with a frequency and a phase of the second clock signal.

In some aspects, a start of the first clock counter circuit is synchronized with a start of the second clock counter circuit.

In some aspects, the first clock counter circuit is configured to count like edges of the first clock signal and the second clock counter circuit is configured to count like edges of the second clock signal. The edges counted by the first and second clock counter circuits may be the same (e.g., both rising or both falling).

In some aspects, the variation circuit includes a training model circuit configured to determine a range of expected values for the plurality of differences corresponding to normal operation. The variation circuit also includes a variation detection circuit operative under control of the training model circuit to determine whether each difference of the plurality of differences is outside of the range of expected values.

In some aspects, the variation detection circuit is configured to output the variation signal indicating a number of times that a difference of the plurality of differences was found to be out of the range of expected values.

In one or more example implementations, a method includes counting a first clock signal to generate a plurality of first counts of the first clock signal. The method includes counting a second clock signal to generate a plurality of second counts of the second clock signal. The method includes synchronizing the plurality of first counts and the plurality of second counts according to a third clock signal. The method includes generating a plurality of differences from respective count pairs as synchronized. Each count pair includes a selected first count of the plurality of first counts and a corresponding second count selected from the plurality of second counts. The method includes generating a variation signal indicating an amount of variation between the first clock signal and the second clock signal based, at least in part, on the plurality of differences.

The foregoing and other implementations can each optionally include one or more of the following features, alone or in combination. Some example implementations include all the following features in combination.

In some aspects, the method includes varying the second clock signal based on the variation signal.

In some aspects, the method includes determining a direction for the amount of variation. The varying varies the second clock signal in the direction.

In an example, the direction may be determined based on detecting transitions in a beacon signal. In another example, the direction may be determined based on a read pointer and a write pointer of a data path clocked by the first clock signal and the second clock signal using a skip/add pattern insertion circuit.

In some aspects, the method includes compensating for the amount of variation by adjusting a phase of the second clock signal.

In some aspects, the method includes compensating for the amount of variation by adjusting at least one of a read pointer or a write pointer of a first-in-first-out memory of a data path clocked using the second clock signal.

In some aspects, the method includes determining a direction for the amount of variation based on detecting transitions in a beacon signal.

In some aspects, the method includes determining a moving average of the plurality of differences over time. The variation signal specifies the moving average.

In some aspects, the generating the variation signal includes generating a plurality of averages of the plurality of differences over time and generating a plurality of further differences between a selected average of the plurality of averages and a corresponding difference selected from the plurality of differences. The variation signal specifies the plurality of further differences.

In some aspects, the first count is determined by a first clock counter circuit configured as a Gray code counter circuit and the second count is determined by a second clock counter circuit also configured as a Gray code counter circuit.

In some aspects, the third clock signal has a frequency and a phase that are uncorrelated with a frequency and a phase of the first clock signal and are uncorrelated with a frequency and a phase of the second clock signal.

In some aspects, the first count is determined by a first clock counter circuit and the second count is determined by a second clock counter circuit. The method includes synchronizing a start of the first clock counter circuit with a start of the second clock counter circuit.

In some aspects, the first clock counter circuit is configured to count like edges of the first clock signal and the second clock counter circuit is configured to count like edges of the second clock signal. The edges counted by the first and second clock counter circuits may be the same (e.g., both rising or both falling).

In some aspects, the method includes training a training model circuit to determine a range of expected values for the plurality of differences corresponding to normal operation and detecting, using a variation detection circuit operative under control of the training model circuit, whether each difference of the plurality of differences is outside of the range of expected values.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

DETAILED DESCRIPTION

Figure 1A:
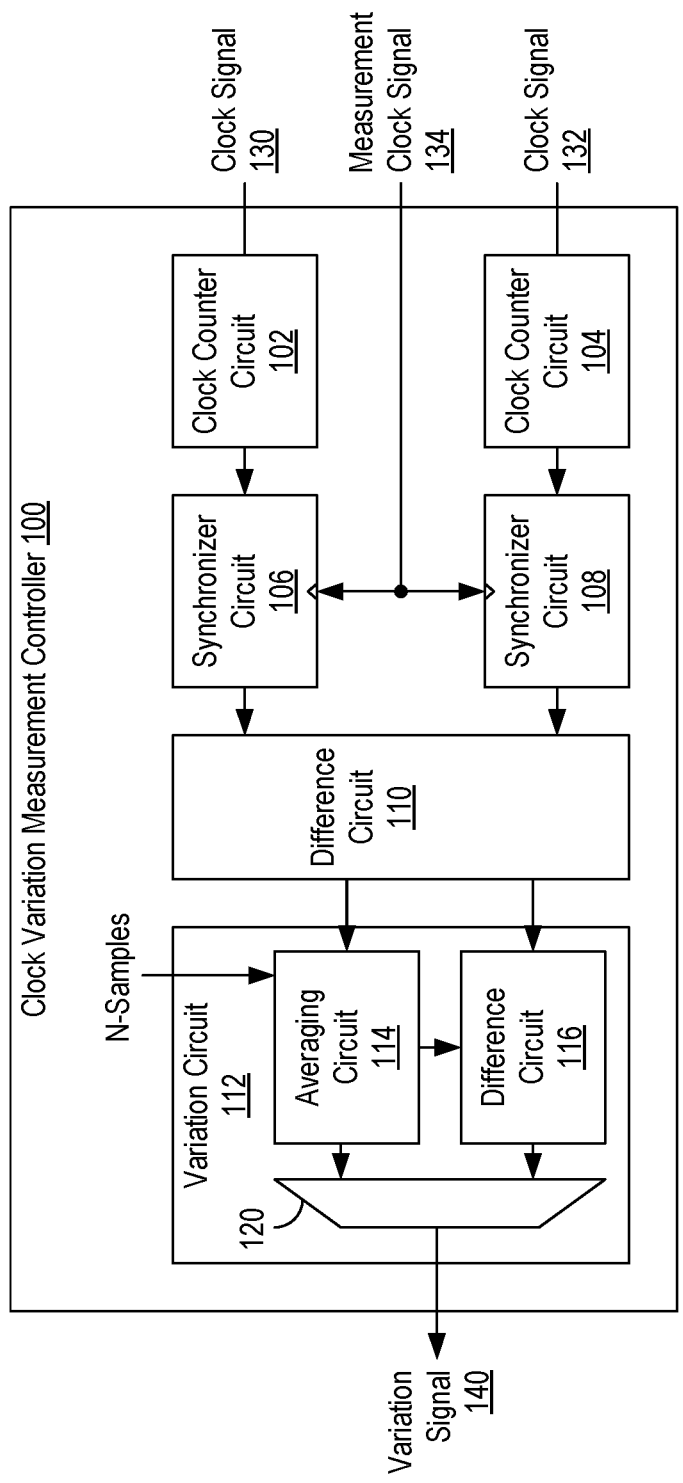
FIG. 1A illustrates an example implementation of a clock variation measurement controller (CVMC).

While the disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to integrated circuits (ICs) and, more particularly, to measuring and compensating for clock tree variation in ICs. In accordance with the inventive arrangements described within this disclosure, measurement circuitry is disclosed that is capable of measuring voltage-temperature (VT) variation in a clock tree that may arise from conditions that may include, but are not limited to, voltage droop, power supply variations, and/or temperature variations. The measurements may be performed for one or more selected nodes of the clock tree. The measurement circuitry is capable of determining how quickly a compensation circuit should operate to compensate for the measured VT variations.

In one or more aspects, the measurement circuitry is capable of evaluating clock signals from the clock tree and calculating quantities such as clock tree VT variation standard deviation from a mean value. The measurement circuit is capable of measuring the clock tree VT variation in real-time. In one or more examples, the measurement circuit is capable of loading the measured values into a buffer, register, or other memory that may be read by other circuitry and/or read by circuitry that is external to the IC. In this manner, compensation circuitry may use the measured values calculated by the measurement circuitry to determine an amount of compensation required and implement a compensation technique with respect to one or more nodes of the IC. The compensation technique may be applied to the clock tree or a data path clocked by a clock signal of the clock tree.

In one or more examples, the compensation circuit may be implemented as phase interpolation-based circuitry. In one or more examples, the compensation circuit may be implemented as skip/add-based circuitry. In alternative examples, other known circuitry capable of compensating for VT variations in clock signals distributed by a clock tree may be included as the compensation circuit. The compensation circuit, using the real-time measured values generated by the measurement circuitry, is capable of minimizing the VT variations and/or the effects of the VT variations in the clock signals distributed by the clock tree.

The inventive arrangements may be used with any of a variety of different circuit architectures that require low and predictable latency. For purposes of illustration and not limitation, the inventive arrangements may be used to minimize VT variations in clock signals of clock trees as applied to and/or used with Peripheral Component Interconnect Express (PCIe) based systems, Common Public Ratio Interface (CPRI) based systems, xGMI4 (Socket to Socket Infinity Fabric) and/or XGMI5 based systems, and Ethernet Precision Time Protocol based systems.

Further aspects of the inventive arrangements are described below with reference to the figures. For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

FIG. 1A illustrates an example implementation of a clock variation measurement controller (CVMC) 100. CVMC 100 may be included within an IC to measure the variation in clock signals arising from VT effects that impact the clock tree of the IC. In one or more examples, CVMC 100 may be included in an IC formed of a single, monolithic die. In one or more other examples, CVMC 100 may be included in an IC that is formed of a plurality of interconnected dies and/or a plurality of interconnected chiplets. CVMC 100 is capable of measuring clock tree variation as a standard deviation from an initial average as described below in greater detail.

In the example, CVMC 100 includes clock counter circuits 102, 104, coupled to synchronizer circuits 106, 108, respectively. CVMC 100 includes a difference circuit 110 coupled to each synchronizer circuit 106, 108. CVMC 100 also includes a variation circuit 112 coupled to difference circuit 110. In one or more example implementations, variation circuit 112 includes an averaging circuit 114 and a difference circuit 116. In the example shown, variation circuit 112 includes a switch 120 that is capable of outputting the signal generated by averaging circuit 114 or difference circuit 116. In one or more examples, switch 120 may be implemented as a multiplexer.

CVMC 100 receives three different input signals shown as clock signal 130, clock signal 132, and measurement clock signal 134. Clock signal 130 is also referred to herein as the "first clock signal" and/or as the "unit interval clock signal." Clock signal 132 is also referred to herein as the "second clock signal" and/or as the root clock signal.

Clock signal 132 is the clock signal for which variation is measured by CVMC 100 with respect to clock signal 130. Clock signal 132 may be a clock signal taken from a selected node of the clock tree of the IC in which CVMC 100 is disposed. For example, different nodes of the clock tree may be multiplexed. A selector circuit may be used to select a particular clock signal from a plurality of available clock signals traversing the clock tree for use as the "root clock signal" or clock signal 132. In the usual case, clock signal 132 traverses a lengthy signal path in the IC that is susceptible to VT variations.

Clock signal 130, or the "unit interval clock signal," is a clock signal that has a fixed clock tree. Clock signal 130 may be a clock signal conveyed over the clock tree that traverses a fixed or shortest path and for which significant VT variation is not expected. In one or more examples, clock signal 130 is one that is routed using high-level metal to reduce VT variations.

In one or more examples, each of clock counter circuits 102, 104 is implemented as a Gray code counter. As known, Gray code is a kind of binary number system where only one bit will change at a time. Clock counter circuit 102 counts selected (e.g., rising or falling) edges of clock signal 130. Clock counter circuit 104 counts selected (e.g., rising or falling) edges of clock signal 132. Appreciably, each counter circuit 102, 104 is configured to count the same type of edge (e.g., both count rising edges or both count falling edges). Each of counter circuits 102, 104 has a reset (not shown) port that receives a reset signal (also not shown). In one or more examples, the reset signal to each respective counter circuit 102, 104 may be released simultaneously or concurrently.

The output signal from each of clock counter circuits 102 and 104 is synchronized according to measurement clock signal 134. As illustrated, the output from clock counter circuit 102 is provided to an input of synchronizer circuit 106. The output of clock counter circuit 104 is provided to an input of synchronizer circuit 108. Each of synchronizer circuit 106 and synchronizer circuit 108 is clocked by measurement clock signal 134. Measurement clock signal 134 is uncorrelated with clock signal 130 with respect to both frequency and phase. Similarly, measurement clock signal 134 is uncorrelated with clock signal 132 with respect to both frequency and phase.

Difference circuit 110 receives counts (e.g., first counts) for clock signal 130 and counts (e.g., second counts) for clock signal 132 as synchronized by synchronizer circuits 106, 108. Difference circuit 110 is capable of taking a difference between the count of clock signal 130 and the count of clock signal 132 (e.g., unit interval count-root clock count) for a given set of counts received on a same clock cycle. For example, a first count and a second count received by difference circuit 110 on a same cycle of measurement clock signal 134 may be said to be a pair and/or correspond with one another. Difference circuit 110 provides the differences as computed for the pairs of counts to variation circuit 112.

In one or more examples, averaging circuit 114 is programmed or configured to compute the average of a specified number of samples (e.g., differences) N. Having been configured, averaging circuit 114 receives the differences as calculated by difference circuit 110 and determines an average of "N" differences as specified by the N-Sample configuration signal. The "N-Sample" signal shown in FIG. 1A indicates the number of cycles, and thus differences or samples, over which the averaging performed by averaging circuit 114 is to be performed. In one aspect, the average, which may be a rolling average for the N samples, may be output by switch 120 as variation signal 140. For example, an updated average may be output by averaging circuit 114 responsive to each newly received difference.

In another example implementation, difference circuit 116 receives the average as calculated by averaging circuit 114 and takes a difference between the average and the difference as output from difference circuit 110. In one aspect, the difference between the average and the difference from difference circuit 110 may be output from switch 120 as variation signal 140. Switch 120, for example, may be configured by way of a select signal to select the output from either averaging circuit 114 or difference circuit 116 as variation signal 140. In one or more other examples, switch 120 may be omitted and variation signal 140 may include both the signal output from averaging circuit 114 and the signal output from difference circuit 116. In that case, switch 120 may be disposed in another location within the IC if needed to select the output from averaging circuit 114 or the output from different circuit 116.

Figure 1B:
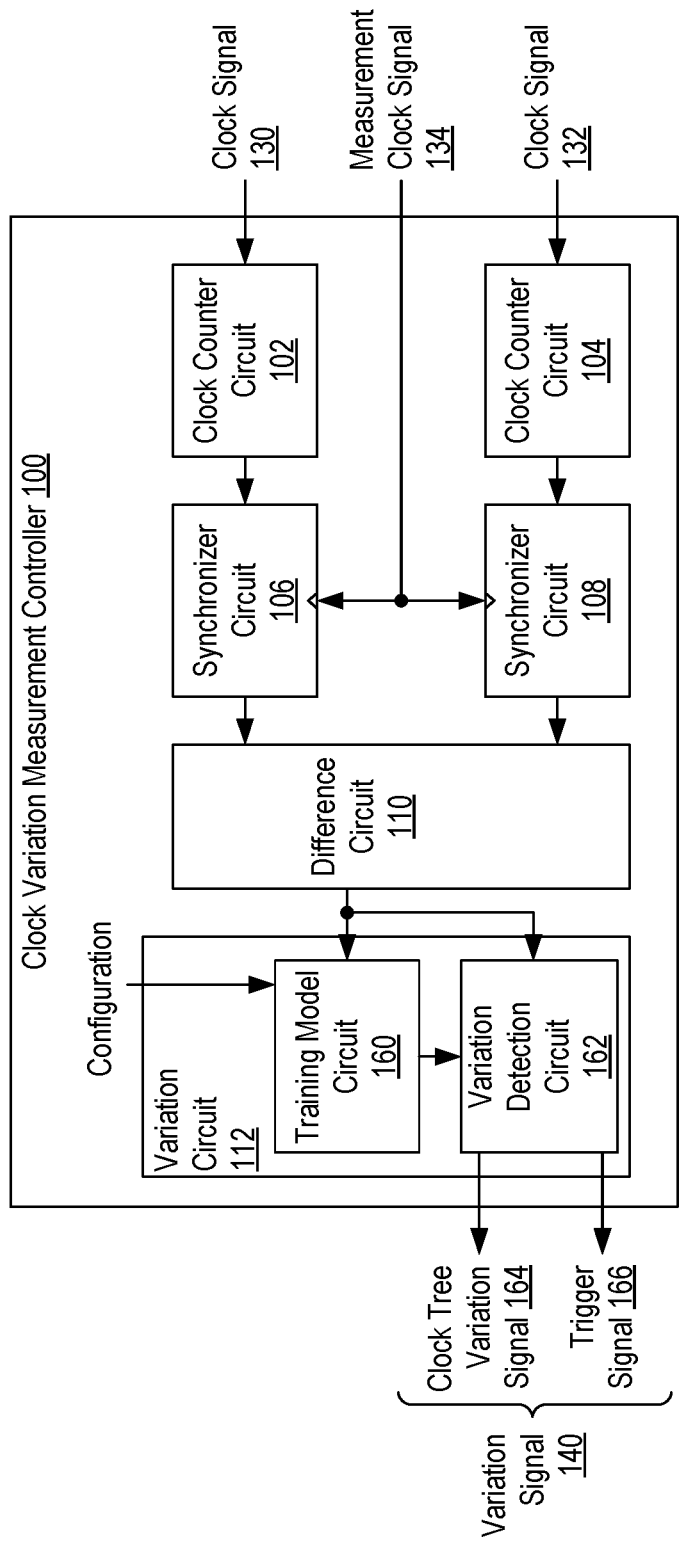
FIG. 1B illustrates another example implementation of a CVMC.

FIG. 1B illustrates another example implementation of a CVMC 100. The CVMC 100 of FIG. 1B is substantially similar to the example CVMC 100 of FIG. 1A with the exception of variation circuit 112. In the example of FIG. 1B, variation circuit 112 includes a training model circuit 160 and a variation detection circuit 162. In one aspect, training model circuit 160 is programmed with configuration data that programs and/or configures training model circuit 160 in terms of a number of samples to be evaluated in a given period to detect differences between clock signals 130, 132. Table 1 below illustrates example configuration data values and corresponding sample counts for configuring training model circuit 160.

TABLE 1

| Configuration Value | Samples |
| --- | --- |
| 000 | 256 |
| 001 | 512 |
| 010 | 1024 |
| 011 | 2048 |
| 100 | 4096 |
| 101 | 8192 |
| 110 | 16384 |
| 111 | 32768 |

In one or more examples, training model circuit 160 may operate, at least initially, for one or more periods of the defined number of samples for training purposes. During this training phase, training model circuit 160 determines the particular values of the differences as output from difference circuit 110 that are considered to be within the expected range for normal operation of the monitored clock signal (e.g., clock signal 132) and the particular values of the differences that are considered to be outside of the expected range for normal operation. For example, the range may be determined as a particular value M plus/minus another value. As an example, the range may be expressed as [M−2:M:M+2]. Once trained, training model circuit 160 is capable of outputting the values defining the expected range to variation detection circuit 162.

Training model circuit 160 is capable of controlling operation of variation detection circuit 162 based on the particular number of samples specified by the configuration. Training model circuit 160 is capable of counting such samples and activating variation detection circuit 162 to operate during windows of the specified number of samples (e.g., for consecutive periods/windows of detection, each period having a length defined by the number of samples specified by the configuration). For example, training model circuit 160 may reset or restart the window for variation detection circuit 162 after detecting the specified number of samples.

Variation detection circuit 162 evaluates the specified number of differences (e.g., samples) received from difference circuit 110. In general, the higher the number of samples selected, the more accurate the variation detection performed by variation detection circuit 162. Variation detection circuit 162, based on the initial values, reset release (under control of training model circuit 160), and clock phase, determines whether the differences (e.g., samples) from difference circuit 110 are within an expected range corresponding to "normal condition." Differences determined by variation detection circuit 162 to be outside of the expected range are considered a clock tree variation.

Variation detection circuit 162 is capable of outputting a clock tree variation signal 164 and a trigger signal 166. Clock tree variation signal 164 specifies a number of times that clock signal 132 is determined to be outside of the expected range (e.g., the number of times that the difference is outside of the expected range). The number of times may be specified on a per window/period basis. Trigger signal 166 may be asserted in response to each detection of a difference being outside of the expected range. Trigger signal 166 may be provided to a processor as an interrupt to signal indicating that compensation of the signal of the clock tree (e.g., clock signal 132) should be started. In the example, for ease of illustration and discussion, signals 164 and 166 also may be referred to individually or collectively as variation signal 140 unless otherwise specified.

Figure 2:
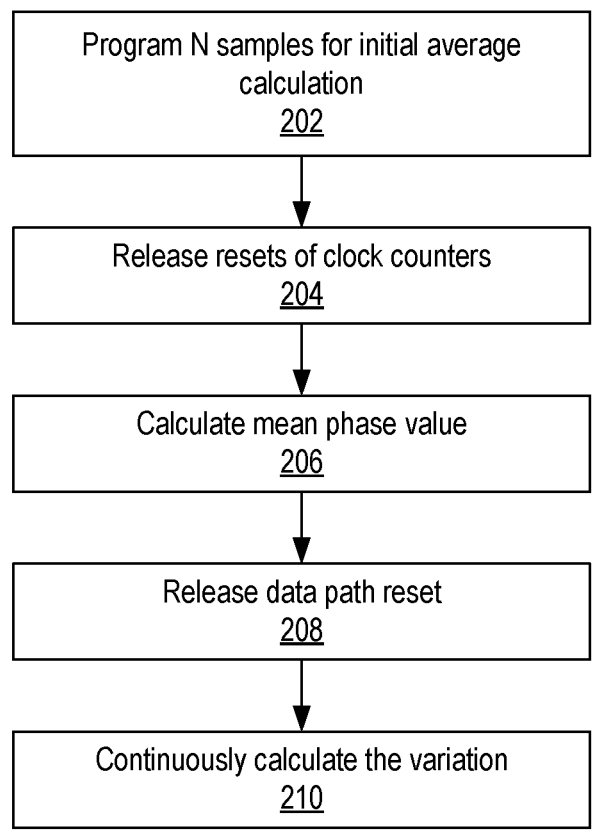
FIG. 2 is a flow chart illustrating certain operative features of the CVMC of FIG. 1.

FIG. 2 is a flow chart illustrating certain operative features of CVMC 100 of FIG. 1A. In block 202, CVMC 100 is programmed with a particular number N for purposes of the averaging calculation implemented by averaging circuit 114. The N-sample signal specifies the number of differences to be used on computing the average. In block 204, the reset for each of clock counter circuits 102, 104 is released. As noted, the reset for clock counter circuits 102, 104 may be released concurrently, e.g., at the same time.

In block 206, averaging circuit 114 calculates a mean phase value. The mean phase value is the average of the differences as calculated by difference circuit 110 over the N clock cycles. Each difference (Diff), as calculated by difference circuit 110, specifies the quantity Diff=[(unit interval clock count)−(root clock count)] for a given cycle of measurement clock signal 134. The mean phase determined by averaging circuit 114 may be calculated as mean phase=ΣDiff/N, where N=0 to N. In block 208, the data path reset is released. For example, once CVMC 100 is operational and the initial variation and phase compensation loops are ready, the data path resets may be released so controllers may begin data transfers and compensation logic may begin compensating for any detected variations. In block 210, CVMC 100 continuously calculates the variation as [(mean phase)−(Diff)]. The variation may be continuously output, e.g., in real-time, as variation signal 140.

In an alternative example corresponding to the example of FIG. 1A, CVMC 100 is programmed with configuration data. The configuration data specifies the number of differences (e.g., samples) to be used for training and/or detection once trained. Subsequent to configuration, the reset for each of clock counter circuits 102, 104 is released. As noted, the reset for clock counter circuits 102, 104 may be released concurrently, e.g., at the same time. Training model circuit 160 may be trained for a plurality of periods of the number of samples specified. For example, training model circuit 160 may be trained to determine a range of expected values for the plurality of differences corresponding to normal operation. Once trained, training model circuit 160 provides the determined expected range to variation detection circuit 162. Variation detection circuit 162 may begin to detect differences that are out of range compared to the expected range. Variation detection circuit 162, operable under control of training model circuit 160, is capable of detecting whether each difference of the plurality of differences is outside of the range of expected values.

Figure 3:
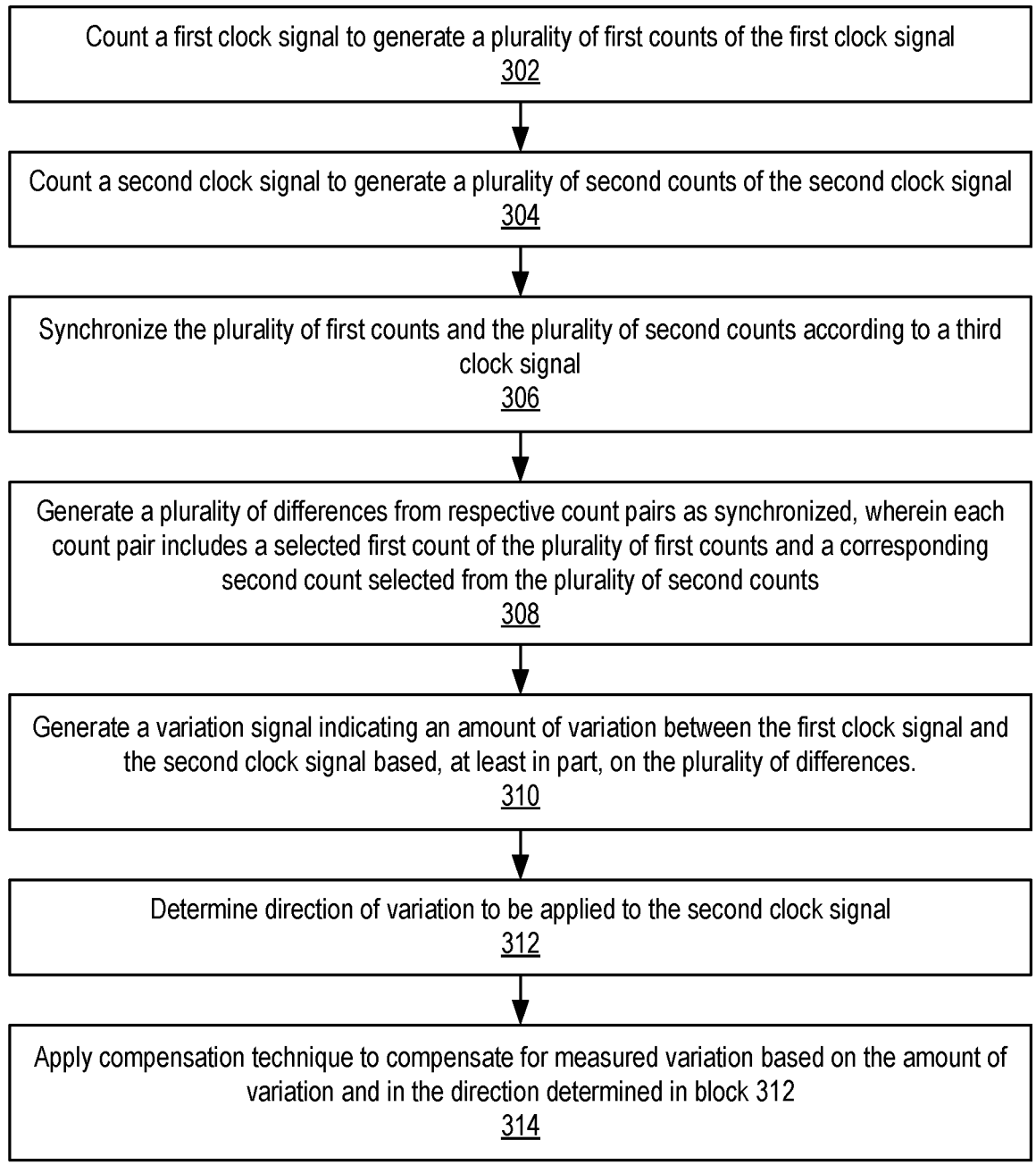
FIG. 3 is another flow chart illustrating certain operative features of the CVMC of FIG. 1A.

FIG. 3 is another flow chart illustrating certain operative features of CVMC 100 of FIG. 1A and CVMC of FIG. 1B subsequent to training. In block 302, clock counter circuit 102 (e.g., a first counter circuit) counts clock signal 130 (e.g., the first clock signal) to generate a plurality of first counts of clock signal 130. In block 304, clock counter circuit 104 (e.g., a second counter circuit) counts clock signal 132 (e.g., the second clock signal) to generate a plurality of second counts of clock signal 132.

In one or more examples, both clock counter circuit 102 and clock counter circuit 104 is implemented as a Gray code counter. Further, the start of clock counter circuit 102 and the start of clock counter circuit 104 may be synchronized. That is, both clock counter circuits 102, 104 may start at the same time. In one or more examples, each of the clock counter circuits 102, 104 is configured to count like edges of the first clock signal and the second clock counter circuit is configured to count like edges of the second clock signal. For example, both clock counter circuits 102, 104 may be configured to count rising edges or both clock counter circuits 102, 104 may be configured to count falling edges.

In block 306, the plurality of first counts and the plurality of second counts are synchronized to measurement clock signal 134 (e.g., a third clock signal). As noted, measurement clock signal 134 has a frequency and a phase that is uncorrelated with the frequency and phase of clock signal 130 and that is uncorrelated with the frequency and phase of clock signal 132.

In block 308, difference circuit 110 generates a plurality of differences from respective count pairs as synchronized. Each count pair includes a selected first count of the plurality of first counts and a corresponding second count selected from the plurality of second counts. For example, each count pair includes a first count and a second count occurring on a same clock cycle as synchronized.

In block 310, variation circuit 112 generates variation signal 140. Variation signal 140 indicates an amount of variation between the clock signal 130 and clock signal 132 based, at least in part, on the plurality of differences.

In one or more examples, variation signal 140 is generated, at least in part, by determining a moving average of the plurality of differences over time using averaging circuit 114. In that case, variation signal 140 specifies the moving average as determined by averaging circuit 114.

In one or more examples, variation signal 140 is generated, at least in part, by generating a plurality of averages of the plurality of differences over time using averaging circuit 114. A plurality of further differences between selected averages of the plurality of averages and corresponding differences selected from the plurality of differences can be calculated by difference circuit 116. In that case, variation signal 140 specifies the plurality of further differences as generated by difference circuit 116.

In one or more examples, variation signal 140 is generated to specify the amount of variation between clock signal 130 and clock signal 132 as the number of times that a received difference was outside of the expected range for a given period of time such as the window defined by the number of samples of the configuration data.

In block 312, a direction of the variation to be applied to clock signal 132 may be determined. In one or more examples, a beacon circuit, described herein in greater detail below, is used to determine the particular direction in which the variation determined in block 310 is used to compensate for the measured variation in clock signal 132. In one or more other examples, read and/or write pointers may be evaluated for portions of the data path by a skip/add pattern insertion circuit and/or controller to determine a direction of the compensation.

In block 314, a compensation technique is applied to compensate for the measured variation in clock signal 132. In one aspect, the compensation technique varies clock signal 132 or an attribute of clock signal 132 (e.g., phase) based on variation signal 140 (e.g., the amount of variation specified by variation signal 140). In another aspect, at least one of a read pointer or a write pointer of a FIFO memory is adjusted or modified based on variation signal 140 (e.g., the amount of variation specified by variation signal 140). Further, any compensation applied by the compensation technique is applied or performed in the in the direction determined in block 312.

Figure 4:
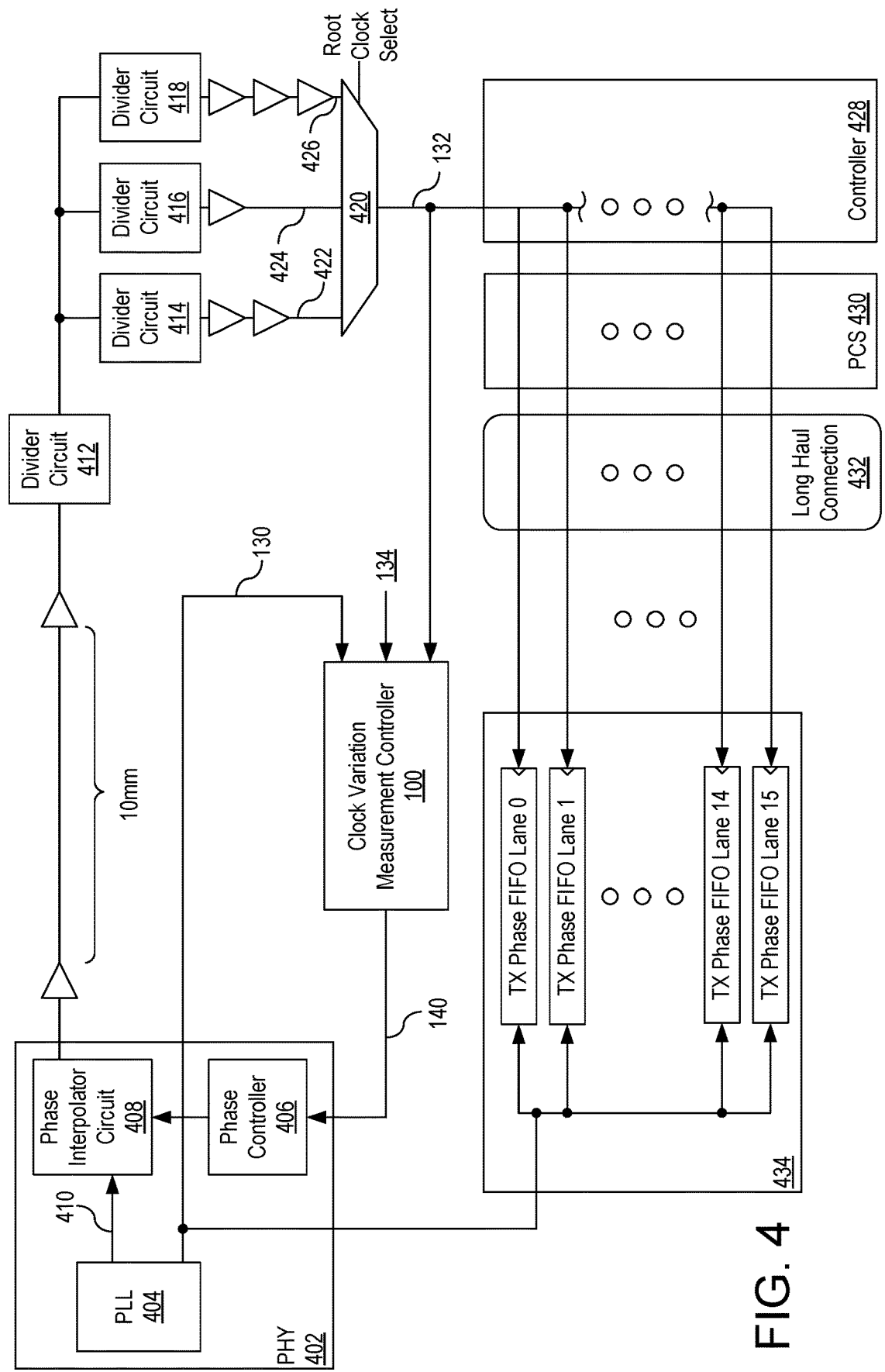
FIG. 4 illustrates an example circuit architecture for compensating for clock signal variation using a phase interpolator and phase controller.

FIG. 4 illustrates an example circuit architecture for compensating for clock signal variation using a first compensation technique. The illustrated circuit architecture may be implemented using a plurality of dies and/or chiplets as part of a single, larger IC or device. The first compensation technique uses a compensation circuit that includes a phase interpolator circuit and a phase controller. The example of FIG. 4 includes CVMC 100 as described in connection with FIG. 1A or 1B, FIG. 2, and FIG. 3. FIG. 4 also illustrates an example where clock signal 132, or an attribute thereof such as phase, is varied to compensate for the clock signal variation through the use of a phase interpolator circuit and a phase controller operating responsive to variation signal 140. The inventive arrangements are capable of operating with an accuracy of 0 PPM.

In the example, a PHY 402 is illustrated that includes a phase locked-loop (PLL) 404, a phase controller 406, and a phase interpolator circuit 408. PHY 402 is an electronic circuit implementing the physical layer of the Open Systems Interconnection (OSI) model. In the example, PHY 402 may be implemented in a die or chiplet that is separate and/or distinct from the other illustrated components in FIG. 4. In one or more examples, phase controller 406 and phase interpolator circuit 408, taken collectively, may be referred to as a delay aligner and phase interpolator (DAPI).

PLL 404 generates a plurality of clock signals including clock signal 410 that traverses through phase interpolator circuit 408 and clock signal 130 that is provided to CVMC 100 as the first clock signal. CVMC 100 may be implemented in a different die/chiplet than PHY 402. In the example, clock signal 410 continues along a lengthy signal path that may traverse through two or more dies/chiplets. The signal path may include divider circuits 412, 414, 416, and 418, a plurality of buffers, and a switch 420 being implemented in a different die/chiplet than PHY 402. As illustrated, clock signal 410 is used to generate a plurality of clock signals 422, 424, and 426. Switch 420, which may be implemented as a multiplexer, passes a particular one of clock signals 422, 424, or 426 as clock signal 132 based on a received root clock select signal.

In view of the differing dies and/or chiplets used, each may have its own characteristics in terms of voltage droop, power supply variations, and/or temperature variations.

Clock signal 132 is provided to a plurality of different locations including CVMC 100 and a controller 428. Controller 428 may be implemented in yet another distinct die/chiplet. For purposes of illustration, controller 428 may be implemented as a PCIe controller, an Ethernet controller, or other type of controller for a communication standard and/or data path for which low and predictable latency are required for proper operation. Clock signal 132, e.g., the root clock signal, traverses from controller 428 to a PCS 430 and on through a long-haul connection 432 to a data path 434. For purposes of illustration and not limitation, long-haul connection 432 may, in some cases, represent a distance of approximately 13-15 mm. Appreciably, the distance may be shorter or longer in different circumstances and/or IC architectures. In one or more examples, CVMC 100 may be included in, part of, or adjacent to data path 434. As illustrated, clock signal 132 is provided to each of a plurality of different transmission (TX) phase first-in-first-out (FIFO) lanes (TX phase FIFO lanes 0-15). Each of TX phase FIFO lanes 0-15 is also clocked on a different port by clock signal 130.

The example circuit architecture of FIG. 4 may be organized as a plurality of different dies including, but not limited to, controllers 428, PCS 430, and PHY 402. Controller 428 may be disposed in a different location of an input/output (I/O) die, for example. PHY 402 distributes the clock to controller 428. Controller 428, as illustrated, is located farther away from PHY 402. Clock signal 132, as provided to controller 428 may be divided and travel significant distance (e.g., via PCS 430) to reach TX phase FIFO lanes of data path 434. The TX phase FIFO lanes of data path 434 implement an interface to PHY 402, which compensates for long routed clock signals (e.g., PHY to controller to PHY).

As illustrated, the route traversed by clock signal 130, as the unit interval clock signal, is more direct than the route traversed by clock signal 132. CVMC 100 is capable of measuring the variation that occurs in clock signal 132 relative to clock signal 130 due to VT effects owing to the longer and/or variable signal path through the clock tree, particularly compared to the more direct and stable path taken by clock signal 130. Variation signal 140, as output by CVMC 100, is provided to phase controller 406. Phase controller 406 is capable of translating the amounts of variation specified by variation signal 140 into phase adjustments (e.g., an amount of phase adjustment applied) that is output to phase interpolator circuit 408 as a control signal to adjust the phase of clock signal 410. Adjusting the phase of clock signal 410 appreciably adjusted the phase of clock signal 132 (e.g., the selected root clock signal). Further, the direction in which the amount of adjustment (e.g., the phase adjustment) is applied may be specified by evaluation of a beacon signal as performed by a beacon circuit to be described herein in greater detail below.

Figure 5:
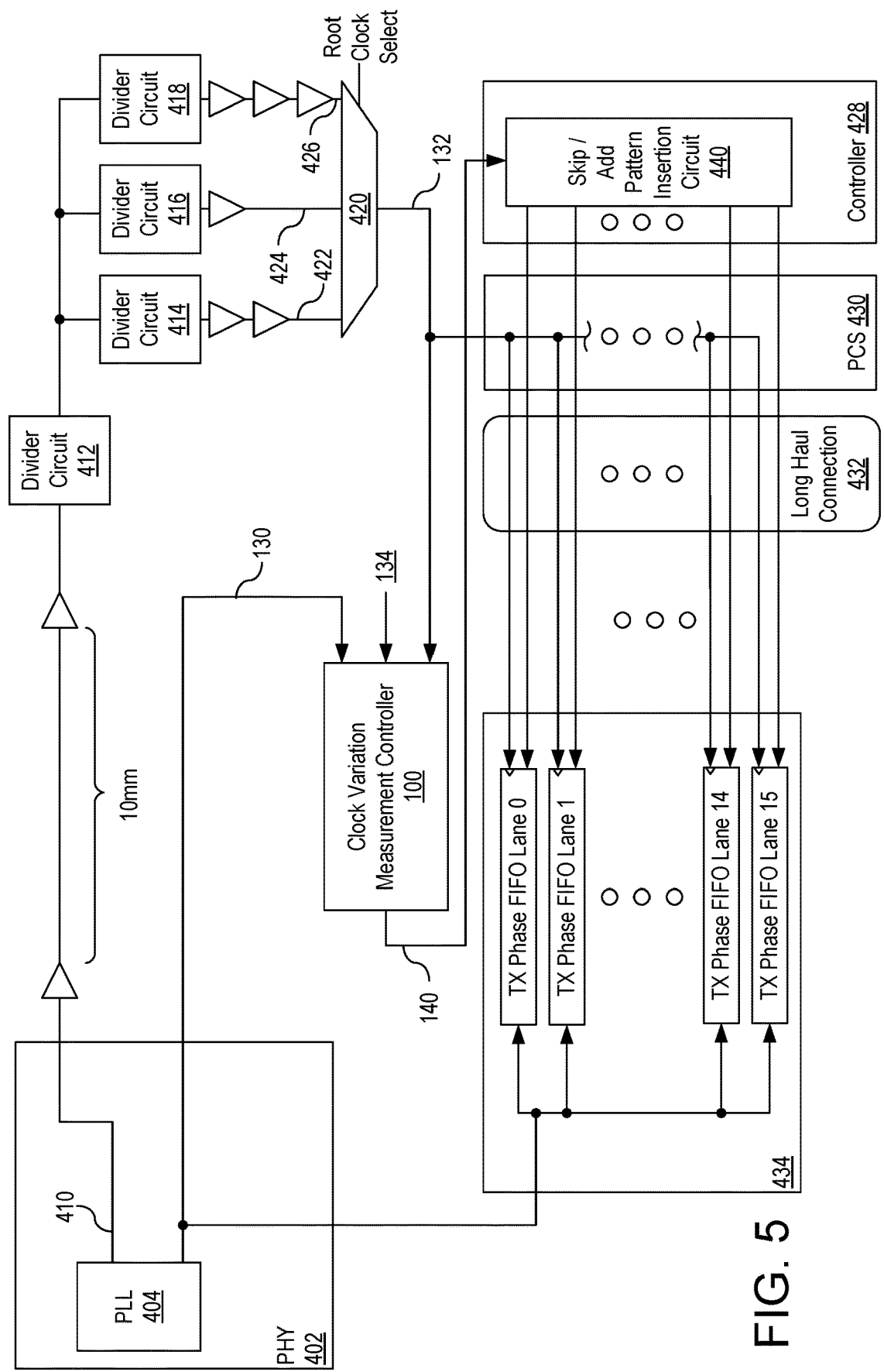
FIG. 5 illustrates another example circuit architecture for compensating for clock signal variation using a skip/add pattern insertion circuit.

FIG. 5 illustrates an example circuit architecture for compensating for clock signal variation using a second compensation technique. The illustrated circuit architecture may be implemented using a plurality of dies and/or chiplets as part of a single, larger IC or device as described in connection with FIG. 4. The second compensation technique uses a compensation circuit that includes a skip/add pattern insertion circuit. The example of FIG. 5 includes CVMC 100 as described in connection with FIG. 1A or 1B, FIG. 2, and FIG. 3. FIG. 5 also illustrates an example where variation signal 140 is provided to skip/add pattern insertion circuit 440. Skip/add pattern insertion circuit 440 is capable of compensating for the measured clock signal variation by adjusting the read pointer for each of TX phase FIFO lanes 0-15 based on the amount of variation specified by variation signal 140. Further, the direction of compensation, e.g., whether a skip or an add is performed, may be specified by a beacon circuit described herein in greater detail below. Further, operation of skip/add pattern insertion circuit 440 is discussed in connection with FIGS. 9 and 10.

In the examples of FIGS. 4 and 5, the depth of the TX phase FIFO memories may be reduced by virtue of implementing the clock tree variation techniques described herein. Without implementing the disclosed compensation techniques, the depths of the TX phase FIFO memories may be larger (e.g., deeper) which requires more circuit resources in the IC and greater area for implementation. Moreover, any reduction in the depth of the phase FIFO memories directly translates into reduced latency and, as such, faster communication.

Figure 6A:
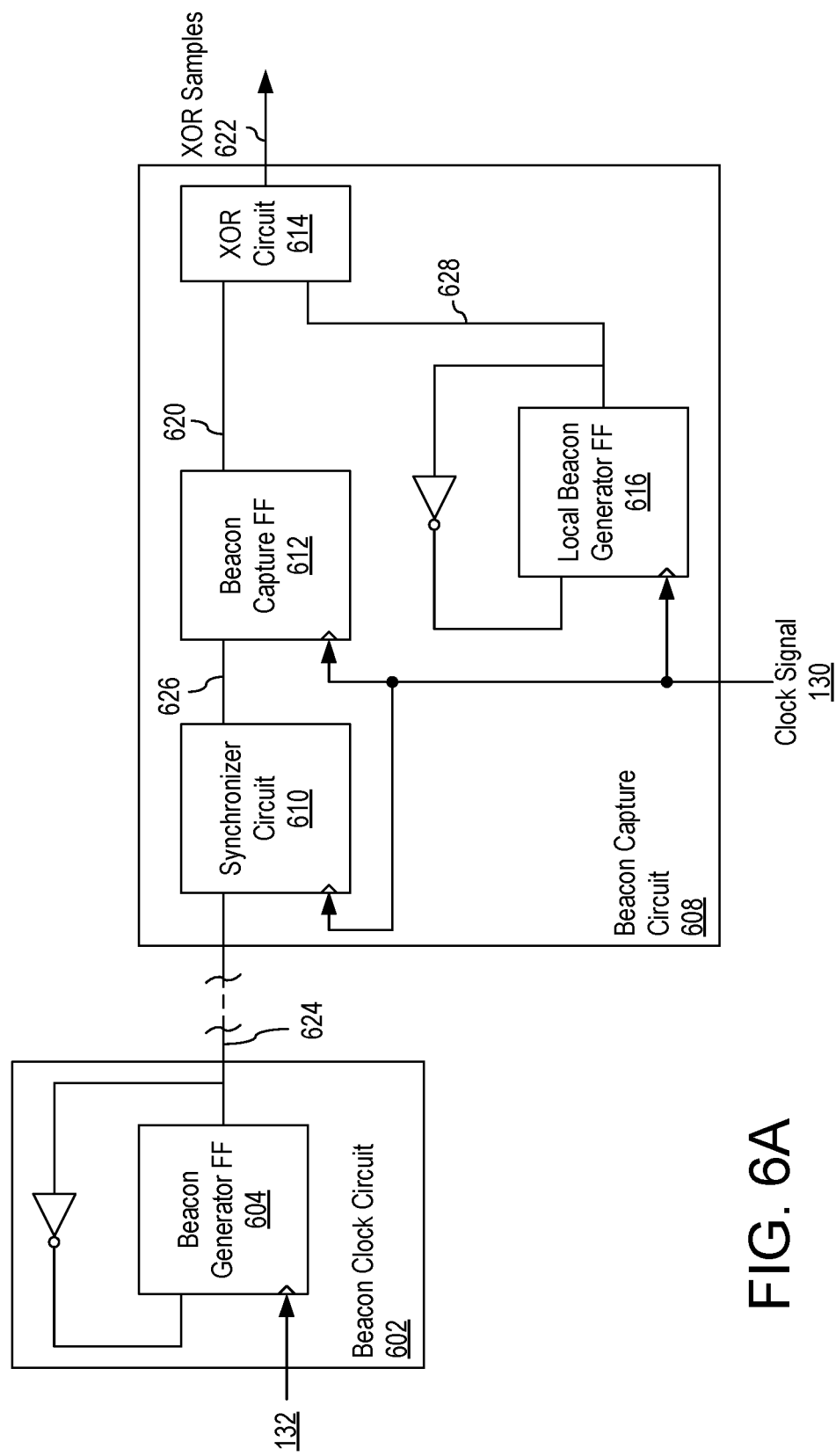
FIG. 6A illustrates an example implementation of a beacon circuit for use with the inventive arrangements described within this disclosure.

FIG. 6A illustrates an example implementation of a beacon circuit for use with the inventive arrangements described within this disclosure. In the example, the beacon circuit includes a beacon clock circuit 602 having a beacon generator flip-flop (FF) 604 therein. Beacon generator FF 604 is configured with an inverting feedback loop. Beacon generator FF 604 is driven by clock signal 132 (e.g., a launch clock) and outputs signal 624 to beacon capture circuit 608.

Beacon capture circuit 608 includes a synchronizer circuit 610 that receives signal 624, a beacon capture FF 612, an XOR circuit 614, and a local beacon generator FF 616. In the example, each of synchronizer circuit 610, beacon capture FF 612, and local beacon generator FF 616 is clocked by clock signal 130. Synchronizer circuit 610 synchronizes the output from beacon generator FF 604 with clock signal 130 to output signal 626. Beacon capture FF captures the rising edge of signal 626 from beacon clock circuit 602 as synchronized and outputs the latched signal synchronized with clock signal 130 to an input of XOR circuit 614. Local beacon generator FF 616 is configured with an inverting feedback path as shown and generates signal 628, which is synchronized with clock signal 130 and is output to a second input of XOR circuit 614. XOR circuit 614 performs a logical exclusive OR operation on signals 620 and 628. XOR circuit 614 outputs XOR samples 622.

Figure 6B:
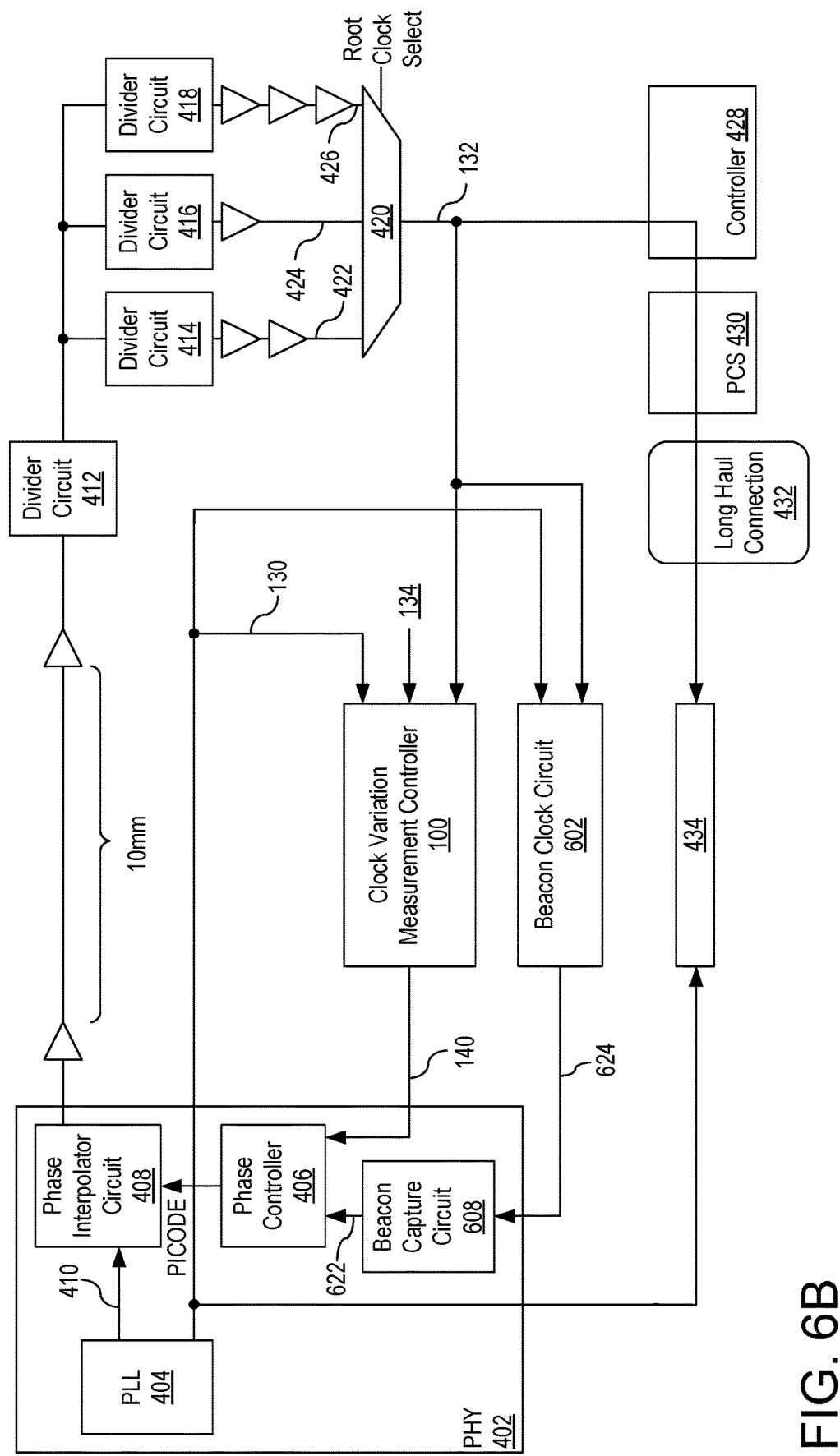
FIG. 6B illustrates an example implementation of the beacon circuit of FIG. 6A within the example circuit architecture of FIG. 4.

In one or more example implementations, beacon clock circuit 602 may be positioned at or about the same location as PLL 404. FIG. 6B illustrates an example implementation of the beacon circuit of FIG. 6A within the example circuit architecture of FIG. 4. As illustrated, beacon capture circuit 608 is disposed in PHY 402. That is, the distance between beacon clock circuit 602 and beacon capture circuit 608 traversing in the direction of clock signal 410 is substantially similar to, e.g., mimics, that distance traversed to meet CVMC 100. Accordingly, the output from XOR circuit 614 in terms of the pattern of zeros and ones (XOR samples 622) may be provided to phase controller 406 to indicate a direction of the compensation to be applied to compensate for the VT variation in clock signal 132. As illustrated, the control signal provided from phase controller 406 to phase interpolator circuit 408 may be referred to and/or specify a phase adjustment in terms of a code referred to as a PICODE (phase interpolator code) that is understandable by phase interpolator circuit 408.

Figure 7:
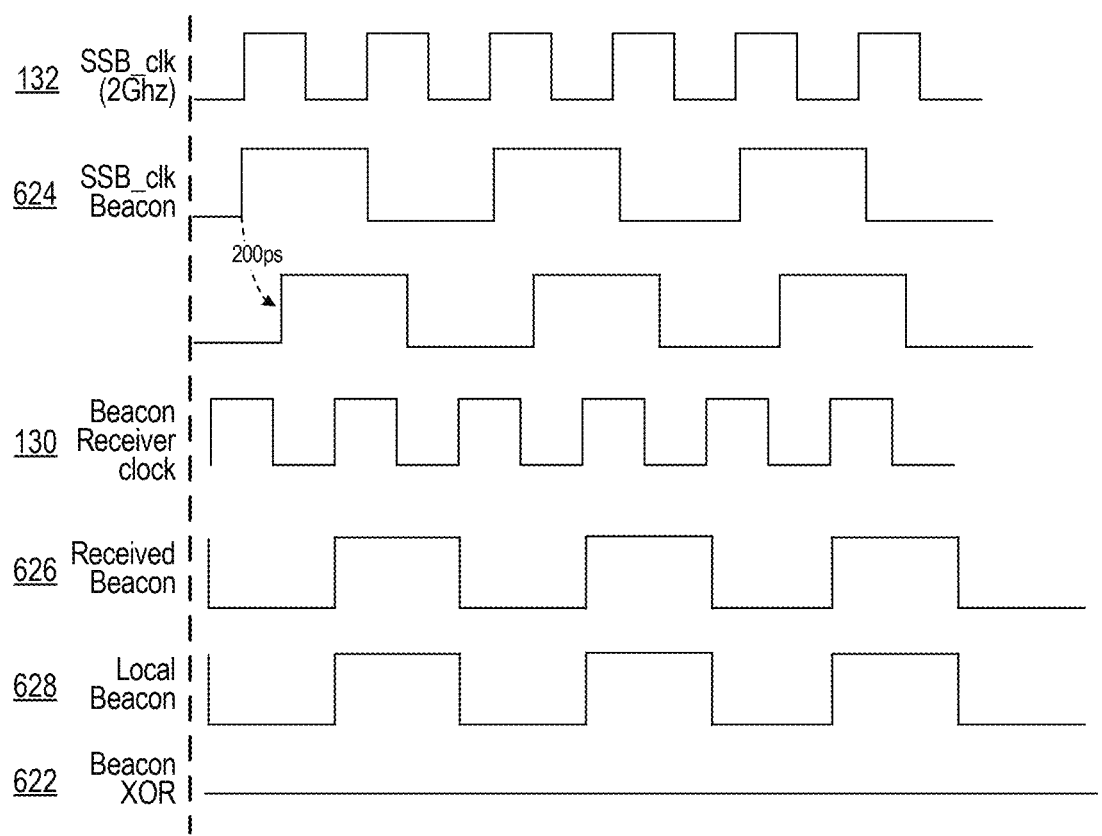
FIG. 7 shows example signal waveforms illustrating certain operative features of the beacon circuit described in connection with FIG. 6A.

FIG. 7 illustrates example signal waveforms illustrating certain operative features of the beacon circuit described in connection with FIG. 6A. An example waveform for each of signals 130, 132, 624, 626, 628, and 622 is illustrated in time.

Figure 8A:
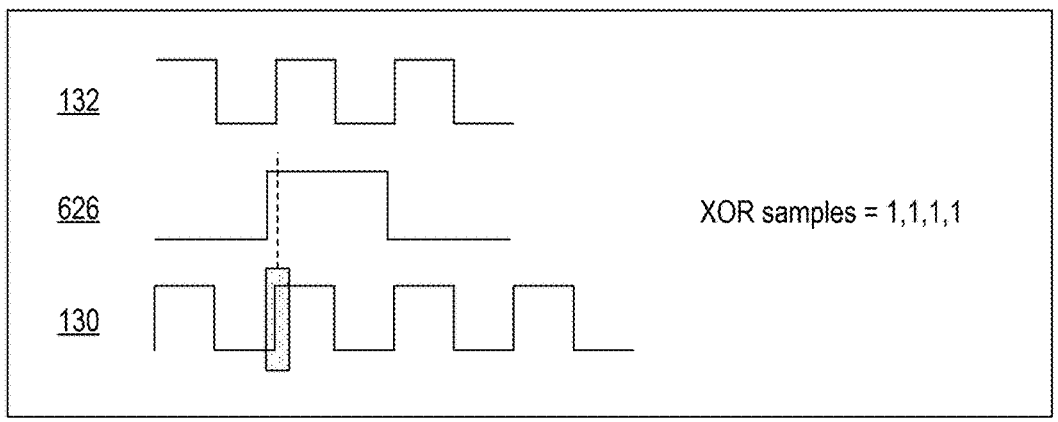
FIGS. 8A, 8B, and 8C illustrate different examples of clock signal variation.
Figure 8B:
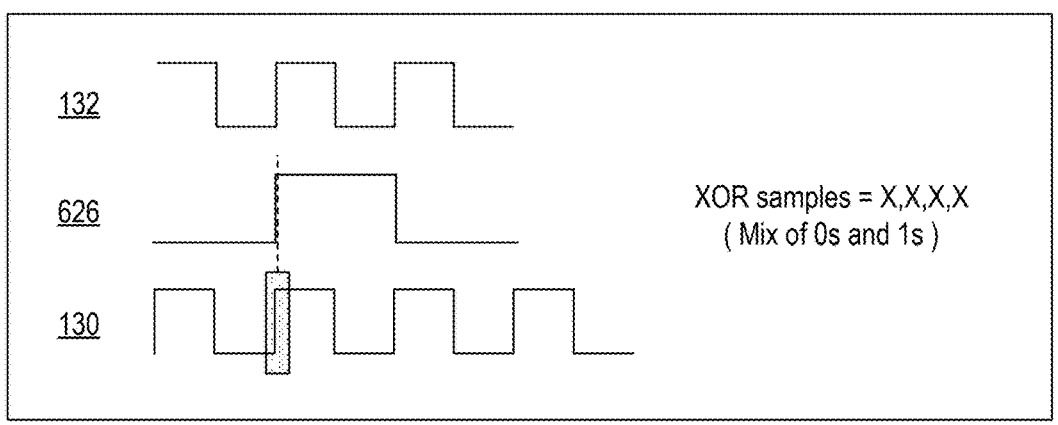
Figure 8C:
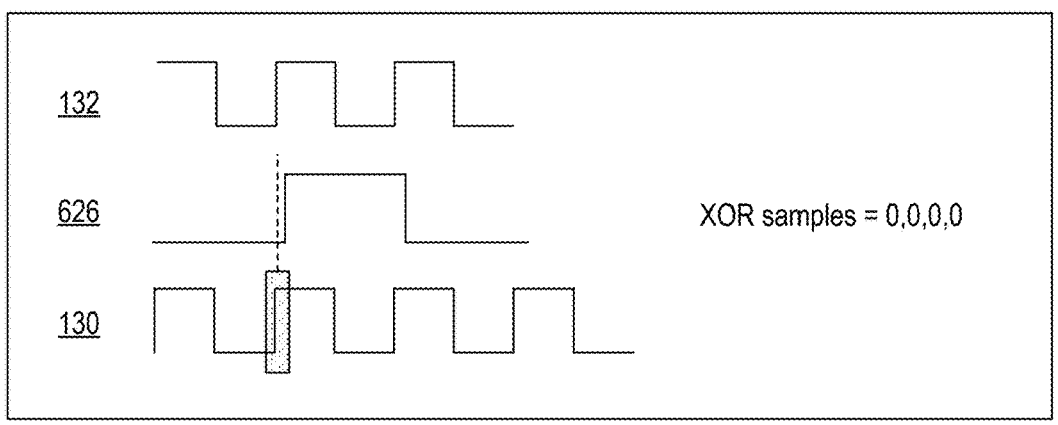

FIGS. 8A, 8B, and 8C show different examples of clock signal variation. The different examples are indicative of a particular directional shift or no shift to be applied for the variation indicated by variation signal 140. More particularly, FIGS. 8A, 8B, and 8C illustrate the direction of shift applied in FIG. 9 described below.

FIG. 8A illustrates the case where clock signal 132 is drifting left. This condition indicates that clock signal 132 should be moved to the right. That is, the direction of compensation is to the right. The case illustrated in FIG. 8A is indicated by detecting consecutive XOR samples of 1, 1, 1, 1.

FIG. 8B illustrates the case where clock signal 132 has ideal alignment and that no adjustments are required. The case illustrated in FIG. 8B is indicated by detecting a mixture of zeros and ones.

FIG. 8C illustrates the case where clock signal 132 is drifting right. This condition indicates that clock signal 132 should be moved to the left. That is, the direction of compensation is to the left. The case illustrated in FIG. 8C is indicated by detecting consecutive XOR samples of 0, 0, 0, 0.

Figure 9:
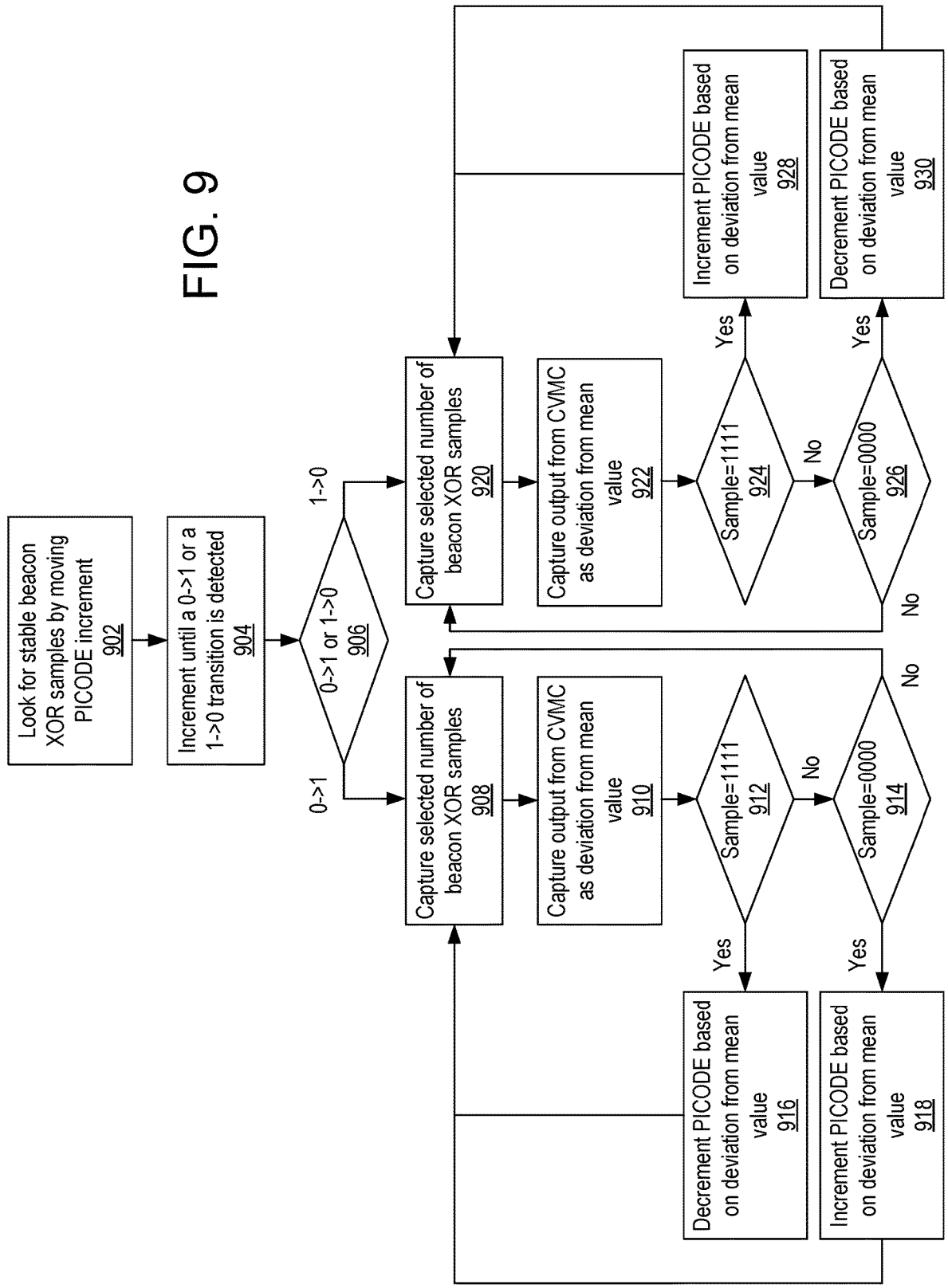
FIG. 9 illustrates an example method of compensating for clock signal variation in accordance with the inventive arrangements described within this disclosure.

FIG. 9 illustrates an example method of compensating for clock signal variation in accordance with the inventive arrangements described within this disclosure. The method of FIG. 9 illustrates operation of the beacon circuit in coordination with the CVMC 100 in connection with FIG. 6B. In the example of FIG. 9, phase controller 406 and phase interpolator circuit 408 as illustrated in FIGS. 4 and 6 are the mechanism by which clock signal 132 is adjusted. An example of compensating for clock signal variation using skip/add pattern insertion circuit 440 of FIG. 5 is described in greater detail in connection with FIG. 10.

In block 902, phase controller 406 begins looking for stable beacon XOR samples from signal 622 by moving (e.g., incrementing) the PICODE (e.g., control signal provided to phase interpolator circuit 408). In block 904, phase controller 406 varies the PICODE until a 0 to 1 or a 1 to 0 transition is detected. For example, phase controller 406 increments the PICODE until a transition is detected. In block 906, the system determines whether a 0 to 1 or a 1 to 0 transition is detected. In response to detecting a 0 to 1 transition, the method of FIG. 9 continues to block 908. In response to detecting a 1 to 0 transition, the method of FIG. 9 continues to block 920.

In block 908, phase controller 406 captures a selected number of beacon XOR samples. For example, phase controller 406 may capture 4 beacon XOR samples from signal 622. In block 910, phase controller 406 captures output from CVMC 100 as variation signal 140 (e.g., the deviation from the mean value or other quantity as specified by variation signal 140). In block 912, the system determines whether the captured beacon XOR samples are [1, 1, 1, 1] corresponding to FIG. 8A. In response to determining that beacon XOR samples of [1, 1, 1, 1] were captured or detected, the method continues to block 916. In block 916, phase controller 406 decrements the PICODE (e.g., the phase control of phase interpolator circuit 408) in an amount corresponding to variation signal 140. For purposes of illustration, the PICODE may be decremented according to Table 2 below.

TABLE 2

| Deviation from Mean Value specified by variation signal 140 | Adjustment of PICODE |
|---|---|
| 0 to 1 | −1 |
| 2 to 5 | −2 |
| 6 to 10 | −4 |
| 11 to 20 | −8 |
| Greater than 20 | −16 |

After block 916, the method loops back to block 908.

In block 914, phase controller 406 determines whether the captured beacon XOR samples are [0, 0, 0, 0] corresponding to FIG. 8C. In response to determining that beacon XOR samples of [0, 0, 0, 0] were captured and/or detected, the method continues to block 918. In block 918, phase controller 406 increments the PICODE in an amount based on variation signal 140. For purposes of illustration, the PICODE may be incremented according to Table 3 below.

TABLE 3

| Deviation from Mean Value specified by variation signal 140 | Adjustment of PICODE |
|---|---|
| 0 to 1 | +1 |
| 2 to 5 | +2 |
| 6 to 10 | +4 |
| 11 to 20 | +8 |
| Greater than 20 | +16 |

After block 918, the method loops back to block 908.

Continuing with block 920, in the case where a 1 to 0 transition is detected, the system captures a selected number of beacon XOR samples. For example, phase controller 406 may capture 4 beacon XOR samples. In block 922, phase controller 406 captures output from CVMC 100 as variation signal 140. In block 924, phase controller 406 determines whether the captured beacon XOR samples are [1, 1, 1, 1] corresponding to FIG. 8A. In response to determining that beacon XOR samples of [1, 1, 1, 1] are captured and/or detected, the method continues to block 928. In block 928, phase controller 406 increments the PICODE in an amount based on variation signal 140. For purposes of illustration, the PICODE may be incremented according to Table 3. After block 928, the method loops back to block 920.

In block 926, the system determines whether the captured beacon XOR samples are [0, 0, 0, 0] corresponding to FIG. 8C. In response to determining that beacon XOR samples of [0, 0, 0, 0] were captured and/or detected, the method continues to block 930. In block 930, phase controller 406 decrements the PICODE in an amount based on variation signal 140. For purposes of illustration, the PICODE may be decremented according to Table 2. After block 918, the method loops back to block 920.

It should be appreciated that the particular values illustrated in Table 2 and/or Table 3 may be adjusted or modified depending on the particular circuit architecture in which CVMC 100, the beacon circuit, and clock signal(s) for which compensation is necessary are disposed. In this regard, the inventive arrangements are not intended to be limited to the particular values and/or examples disclosed within this disclosure.

Figure 10:
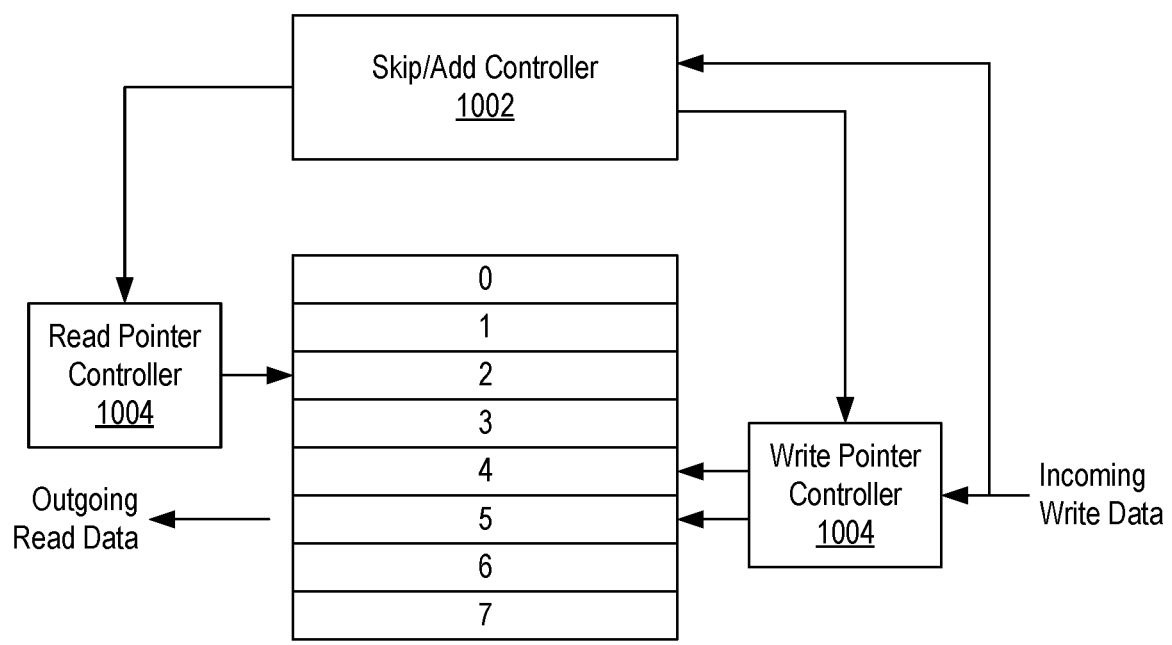
FIG. 10 illustrates certain operative features of the transmit phase first-in-first-out (FIFO) memory of FIG. 5 as controlled for clock signal variation compensation.

FIG. 10 illustrates certain operative features of the TX phase FIFO memory of FIG. 5 as controlled for clock signal variation compensation. The TX phase FIFO may be for a particular lane and illustrates operation of skip/add pattern insertion circuit 440 in adjusting the data path based on the variation signal output from CVMC 100 and the direction as may be determined using the beacon circuit as discussed in connection with FIG. 9. FIG. 10 illustrates how clock signal variation may be compensated using the skip/add pattern insertion circuit 440 in place of phase adjustments. In the example, the read pointer is set to entry 2 while the write pointer is set to entry 5. The TX phase FIFO has a latency defined by [(write pointer)−(read pointer)]=5−2=3. A skip/add controller 1002 of the skip/add pattern insertion circuit 440 may be coupled to a read pointer controller 1004 to read the current read pointer and/or to adjust the current read pointer. Skip/add controller 1002 is also coupled to a write pointer controller 1004 to read the current write pointer and/or to adjust the current write pointer.

In one or more example implementations, a lower threshold of 2 and an upper threshold of 4 may be set. In response to determining that the latency is less than 2 (the lower threshold) and that the absolute value of the variation as specified by variation signal 140 is greater than 10, clock signal 132 should be moved to the left. In that case, skip/add pattern insertion circuit 440 may pause the position of the read pointer to increase the gap between the read pointer and the write pointer. This condition may arise when a predefined ordered set (OS or "pattern") appears in the data.

In response to determining that the latency is greater than or equal to 4 (the upper threshold) and that the absolute value of the variation as specified by variation signal 140 is greater than 10, clock signal 132 should be moved to the right. In that case, skip/add pattern insertion circuit 440 increases the position of the read pointer to skip or jump +1 to reduce the gap between the read pointer and the write pointer. This condition also may arise when a predefined OS appears in the data.

Referring to FIG. 5 and to FIG. 10, controller 428 may be the circuit block responsible for inserting the skip or add patterns in the data traffic for the TX phase FIFO memories corresponding to lanes 0-15 to adjust the pointers. The skip and add patterns are defined to indicate when to pause the read pointer or when to increment the read pointer, respectively, based in the OS/pattern detected in the data traffic.

In the example of FIG. 5 and FIG. 10, the compensation that is implemented is operative in terms of clock cycles only. That is, compensation may be implemented as +1 clock cycle or −1 clock cycle. CVMC 100 may be used to indicate, by virtue of variation signal 140, when to perform such a compensation as the smaller adjustments possible with the example of FIG. 4 and FIG. 9 may not be performed.

The inventive arrangements described herein may be applied to cases where clock tree compensation is needed for multilane protocols. Each lane, for example, may include a CVMC 100 and a beacon circuit so that the clock signal variation measurements described herein and the compensation described herein may be applied on a per lane basis.

The terminology used herein is for the purpose of describing particular embodiments only and is not intended to be limiting. Notwithstanding, several definitions that apply throughout this document are expressly defined as follows.

As defined herein, the singular forms "a," "an," and "the" are intended to include the plural forms as well, unless the context clearly indicates otherwise.

As defined herein, the term "approximately" means nearly correct or exact, close in value or amount but not precise. For example, the term "approximately" may mean that the recited characteristic, parameter, or value is within a predetermined amount of the exact characteristic, parameter, or value.

As defined herein, the terms "at least one," "one or more," and "and/or," are open-ended expressions that are both conjunctive and disjunctive in operation unless explicitly stated otherwise. For example, each of the expressions "at least one of A, B, and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, the term "automatically" means without human intervention.

As defined herein, the term "if" means "when" or "upon" or "in response to" or "responsive to," depending upon the context. Thus, the phrase "if it is determined" or "if [a stated condition or event] is detected" may be construed to mean "upon determining" or "in response to determining" or "upon detecting [the stated condition or event]" or "in response to detecting [the stated condition or event]" or "responsive to detecting [the stated condition or event]" depending on the context.

As defined herein, the term "responsive to" and similar language as described above, e.g., "if," "when," or "upon," means responding or reacting readily to an action or event. The response or reaction is performed automatically. Thus, if a second action is performed "responsive to" a first action, there is a causal relationship between an occurrence of the first action and an occurrence of the second action. The term "responsive to" indicates the causal relationship.

As defined herein, the terms "one embodiment," "an embodiment," "in one or more embodiments," "in particular embodiments," or similar language mean that a particular feature, structure, or characteristic described in connection with the embodiment is included in at least one embodiment described within this disclosure. Thus, appearances of the aforementioned phrases and/or similar language throughout this disclosure may, but do not necessarily, all refer to the same embodiment.

As defined herein, the term "real-time" means a level of processing responsiveness that a user or system senses as sufficiently immediate for a particular process or determination to be made, or that enables the processor to keep up with some external process.

As defined herein, the term "substantially" means that the recited characteristic, parameter, or value need not be achieved exactly, but that deviations or variations, including for example, tolerances, measurement error, measurement accuracy limitations, and other factors known to those of skill in the art, may occur in amounts that do not preclude the effect the characteristic was intended to provide.

The terms first, second, etc., may be used herein to describe various elements. These terms should not be limited by these terms, as these terms are only used to distinguish one element from another unless stated otherwise or the context clearly indicates otherwise.

In some alternative implementations, the operations noted in the blocks may occur out of the order noted in the figures. For example, two blocks shown in succession may be executed substantially concurrently, or the blocks may sometimes be executed in the reverse order, depending upon the functionality involved. In other examples, blocks may be performed generally in increasing numeric order while in still other examples, one or more blocks may be performed in varying order with the results being stored and utilized in subsequent or other blocks that do not immediately follow. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system for clock variation measurement, comprising:
a first clock counter circuit configured to generate a plurality of first counts of a first clock signal;
a second clock counter circuit configured to generate a plurality of second counts of a second clock signal;
a first synchronizer circuit configured to synchronize the plurality of first counts according to a third clock signal;
a second synchronizer circuit configured to synchronize the plurality of second counts according to the third clock signal;
a difference circuit configured to generate a plurality of differences from respective count pairs as synchronized, wherein each count pair includes a selected first count of the plurality of first counts and a corresponding second count selected from the plurality of second counts; and
a variation circuit configured to generate a variation signal indicating an amount of variation between the first clock signal and the second clock signal based, at least in part, on the plurality of differences, wherein the variation circuit comprises an averaging circuit configured to generate a plurality of averages of the plurality of differences over time.

2. The system of claim 1, further comprising:
a compensation circuit configured to compensate for the amount of variation determined by the variation circuit.

3. The system of claim 2, further comprising:
a beacon circuit configured to determine a direction of the amount of variation based on detecting transitions in a beacon signal;
wherein the compensation circuit is configured to compensate for the amount of variation between the first clock signal and the second clock signal in the direction determined by the beacon circuit.

4. The system of claim 2, further comprising:
a skip/add pattern insertion circuit configured to determine a direction of the amount of variation based on a read pointer and a write pointer of a data path clocked by the first clock signal and the second clock signal;
wherein the compensation circuit is configured to compensate for the amount of variation between the first clock signal and the second clock signal in the direction determined.

5. The system of claim 1, wherein the variation circuit comprises a difference circuit configured to determine a plurality of further differences between selected averages of the plurality of averages and corresponding differences selected from the plurality of differences.

6. The system of claim 1, wherein the first synchronizer circuit is coupled to an output of the first clock counter circuit and the second synchronizer circuit is coupled to an output of the second clock counter circuit.

7. The system of claim 1, wherein the third clock signal has a frequency and a phase that are uncorrelated with a frequency and a phase of the first clock signal and are uncorrelated with a frequency and a phase the second clock signal.

8. A system for clock variation measurement, comprising:
a first clock counter circuit configured to generate a plurality of first counts of a first clock signal;
a second clock counter circuit configured to generate a plurality of second counts of a second clock signal;
a first synchronizer circuit configured to synchronize the plurality of first counts according to a third clock signal;
a second synchronizer circuit configured to synchronize the plurality of second counts according to the third clock signal;
a difference circuit configured to generate a plurality of differences from respective count pairs as synchronized, wherein each count pair includes a selected first count of the plurality of first counts and a corresponding second count selected from the plurality of second counts; and
a variation circuit configured to generate a variation signal indicating an amount of variation between the first clock signal and the second clock signal based, at least in part, on the plurality of differences, wherein the variation circuit comprises:
a training model circuit configured to determine a range of expected values for the plurality of differences corresponding to normal operation; and
a variation detection circuit operative under control of the training model circuit to determine whether each difference of the plurality of differences is outside of the range of expected values.

9. The system of claim 8, wherein the variation detection circuit is configured to output the variation signal indicating a number of times that a difference of the plurality of differences was found to be out of the range of expected values.

10. The system of claim 8, further comprising:
a compensation circuit configured to compensate for the amount of variation determined by the variation circuit.

11. The system of claim 10, further comprising:
a beacon circuit configured to determine a direction of the amount of variation based on detecting transitions in a beacon signal, wherein the compensation circuit is configured to compensate for the amount of variation between the first clock signal and the second clock signal in the direction determined by the beacon circuit; or a skip/add pattern insertion circuit configured to determine a direction of the amount of variation based on a read pointer and a write pointer of a data path clocked by the first clock signal and the second clock signal, wherein the compensation circuit is configured to compensate for the amount of variation between the first clock signal and the second clock signal in the direction determined.

12. A method, comprising:

counting a first clock signal to generate a plurality of first counts of the first clock signal;

counting a second clock signal to generate a plurality of second counts of the second clock signal;

synchronizing the plurality of first counts and the plurality of second counts according to a third clock signal;

generating a plurality of differences from respective count pairs as synchronized, wherein each count pair includes a selected first count of the plurality of first counts and a corresponding second count selected from the plurality of second counts; and generating a variation signal indicating an amount of variation between the first clock signal and the second clock signal based, at least in part, on the plurality of differences;

wherein the third clock signal has a frequency and a phase that are uncorrelated with a frequency and a phase of the first clock signal and are uncorrelated with a frequency and a phase of the second clock signal.

13. The method of claim 12, further comprising:
varying the second clock signal based on the variation signal.

14. The method of claim 13, further comprising:
determining a direction for the amount of variation;
wherein the varying varies the second clock signal in the direction.

15. The method of claim 12, further comprising:
compensating for the amount of variation by adjusting at least one of a read pointer or a write pointer of a first-in-first-out memory of a data path clocked using the second clock signal.

16. The method of claim 15, further comprising:
determining a direction for the amount of variation based on detecting transitions in a beacon signal.

17. The method of claim 12, further comprising:
determining a moving average of the plurality of differences over time, wherein the variation signal specifies the moving average.

18. The method of claim 12, wherein the generating the variation signal comprises:
generating a plurality of averages of the plurality of differences over time; and
generating a plurality of further differences between a selected average of the plurality of averages and a corresponding difference selected from the plurality of differences;
wherein the variation signal specifies the plurality of further differences.

19. The method of claim 12, wherein the plurality of first counts are determined by a first clock counter circuit configured as a Gray code counter circuit and the plurality of second counts are determined by a second clock counter circuit also configured as a Gray code counter circuit.

20. The method of claim 12, further comprising:
training a training model circuit to determine a range of expected values for the plurality of differences corresponding to normal operation; and
detecting, using a variation detection circuit operative under control of the training model circuit, whether each difference of the plurality of differences is outside of the range of expected values.

* * * * *